United States Patent [19]
Strach et al.

[11] Patent Number: 5,890,663
[45] Date of Patent: Apr. 6, 1999

[54] PROCESS FOR RECOVERING FERROUS VALUES FROM MUNICIPAL SOLID WASTE

[75] Inventors: Larry Strach; Gary M. Carraux, both of Ponte Vedra Bch; Ronald H. Ogletree, Jacksonville, all of Fla.

[73] Assignee: DUOS Engineering (USA), Inc., Jacksonville, Fla.

[21] Appl. No.: 928,111

[22] Filed: Sep. 12, 1997

[51] Int. Cl.$^6$ .................................................. B02C 19/12
[52] U.S. Cl. ......................................... 241/19; 241/24.14
[58] Field of Search ............................... 241/24.14, 79.1, 241/DIG. 38, 19

[56] References Cited

U.S. PATENT DOCUMENTS

| | | | |
|---|---|---|---|
| 3,885,744 | 5/1975 | Drage | 241/24.14 |
| 5,174,509 | 12/1992 | Starke et al. | 241/24.14 |
| 5,184,780 | 2/1993 | Wiens | 241/24.14 |
| 5,356,082 | 10/1994 | Prinz et al. | 241/24.14 |

*Primary Examiner*—Mark Rosenbaum
*Attorney, Agent, or Firm*—Arthur G. Yeager

[57] ABSTRACT

Dry municipal solid waste material is subjected to a two-step magnetic separation process to recover ferrous values therefrom. The process includes passing the raw solid waste material through a shredder to reduce the waste to particles at a size of 3 inches or less, passing the particles through a series of two magnetic fields, recovering ferrous-containing fractions from each passage, combining the two ferrous-containing fractions and subjecting them to air classification in a cyclone separator to recover a clean particulate ferrous product, and a waste byproduct and recycling the waste byproduct to pass again through one or both of the two magnetic fields.

20 Claims, 1 Drawing Sheet

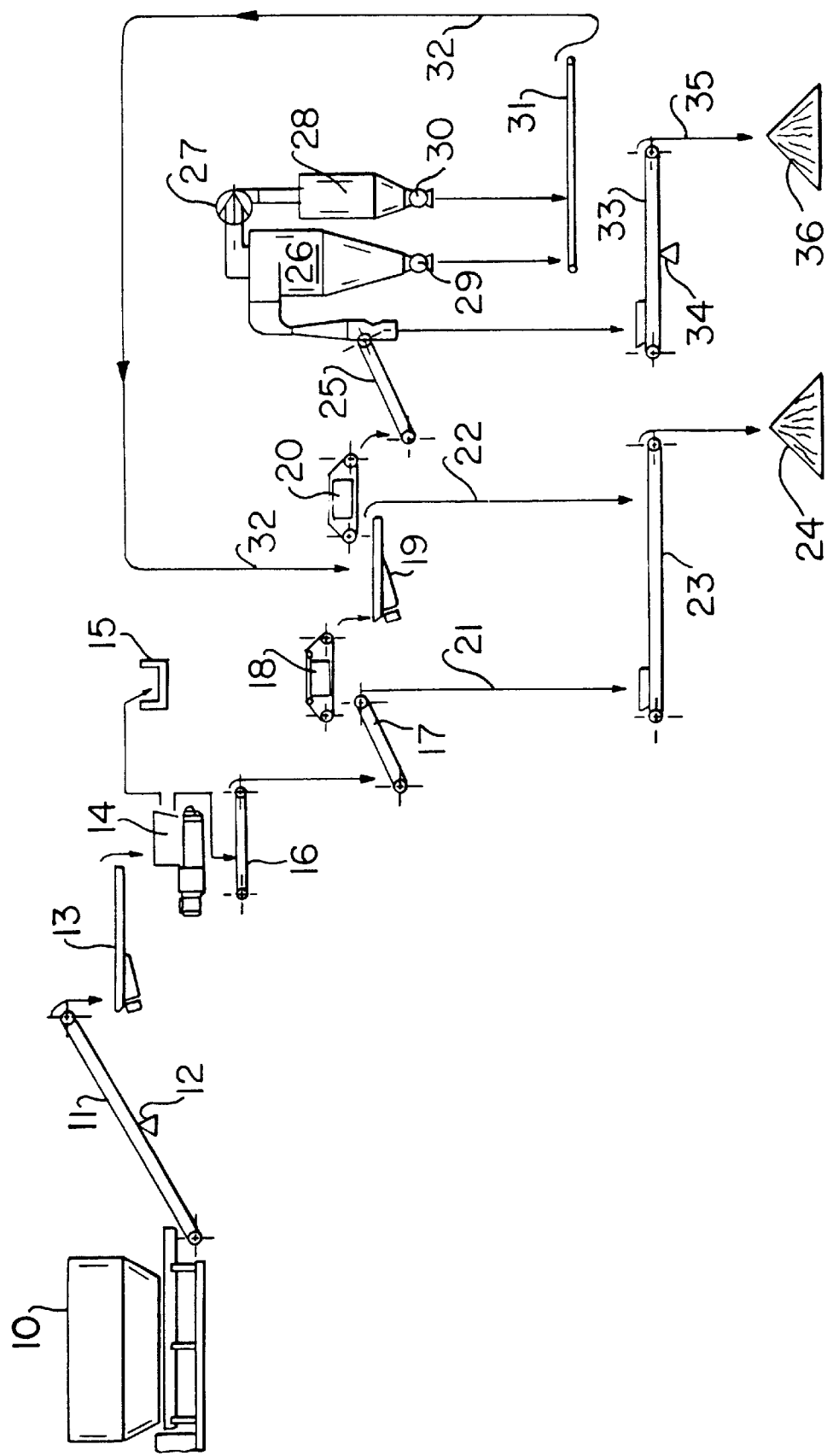

PROCESS FOR RECOVERING FERROUS VALUES FROM MUNICIPAL SOLID WASTE

TECHNICAL FIELD

This invention relates to the technology of waste treatment; and, more particularly, to the technology of treating municipal dry waste to recover ferrous values therefrom.

BACKGROUND OF THE INVENTION

The treatment of waste materials from residential and business areas so as to recover any valuable materials and to reduce the volume of nonvaluable waste is a large problem in the world, and is becoming a larger problem as the population increases. One form of waste management is to incinerate all waste to reduce the waste materials physical volume thus creating ash. In more recent times it has been recognized that some valuable materials can be recovered from the waste before transforming it into ash. An application, filed on Jul. 26, 1996, Ser. No. 08/686,765; entitled "An Improved Process For Processing Ash", is commonly owned with this application which describes and claims a system for treating waste material to recover values therefrom.

It is an object of this invention to provide such a process designed specifically to recover ferrous values from municipal waste. It is another object of this invention to provide a process involving magnetic attraction forces to assist in recovering ferrous values from municipal waste. Still other objects will become apparent from the more detailed descriptions which follow.

SUMMARY OF THE INVENTION

This invention relates to a process for recovering ferrous values from trash and other such waste materials. The process involves several sequential steps of magnetic separation and recycling of materials subjected to such separation steps. Preferably the process is continuous and includes at least the following steps:

1) passing the trash and other waste material through a size reduction process to produce particles having a maximum predetermined size of about 3 inches;
2) passing the original size-reduced mass of particles through magnetic separation consisting of a first magnetic field to separate a first cut of ferrous-containing particles from the first remainder of the original mass;
3) passing the said first remainder through a second magnetic field to separate a second cut of ferrous-containing particles from the second remainder of the original mass;
4) combining said first and second cuts of ferrous-containing particles and subjecting the combined cuts to a negative pressure air classification system which separates lightweight nonferrous particulate waste materials therefrom and thereby concentrate the heavier ferrous values therein;
5) cleaning the concentrated ferrous values from step 4 to separate a clean ferrous product from an unclean by-product including dust trapped by a filtration step; and
6) recycling said unclean granular by-product by adding said by-product to said first remainder of step 3).

The second remainder from step 3) is collected for further processing as desired e.g., to separate other values therefrom, to be burned to ash. The clean ferrous product of step 5) may, of course, be further treated in any of a variety of ways, depending in the purchaser. For example, the product may be used as a portion of the feed to a steel furnace.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawing showing a flow sheet of the process of this invention.

DETAILED DESCRIPTION OF THE INVENTION

The process of this invention is best understood by reference to the attached drawing showing a flow sheet of the process for treating trash and waste such as the dry waste materials collected in municipalities for disposal in some sanitary acceptable manner. Such trash and waste may include paper, glass, plastic, metal, wood, and fiber materials whether they be organic, inorganic, synthetic or the like. Such trash and waste is the input feed to this process and is collected in an infeed hopper 10. Since this process is directed at the separation and collection of ferrous metals from municipal trash and waste, the materials collected in hopper 10 may be those that have gone through some presorting treatment to reduce the vast bulk of trash and waste to that which contains all or nearly all of the ferrous materials. The presorting step may take any of a variety of procedures, depending on what values are to be recovered from the trash and waste. If no such values are present, the presorting procedure might be burning to reduce all combustibles to ashes before leaving hopper 10. In any event, the material leaving hopper 10 must be reduced to an acceptable size, e.g., not larger than 3 inches before proceeding to the separation steps. Material leaving hopper 10 is carried by belt conveyor 11 over scales 12 to vibrating conveyor 13 which feeds a steady stream of material to shredder 14 which reduces the size of the particles to any given dimension e.g., not greater than 3 inches. Any materials which do not shred to the proper size are shunted off to container 15 for special handling (shredding by hand or discard). The bulk of the shredded material is then discharged onto conveyor 16 which feeds the material onto conveyor 17 which conducts the material through a first magnetic field provided by magnet 18. Material not picked up by magnet 18 is directed to belt 23 which discharges the non-magnetic materials to pile 24. The material attracted to magnet 18 is discharged onto vibrating belt conveyor 19 and thence through a second magnetic field provided by magnet 20. Materials not attracted by magnet 20 are discharged to belt 23 and thence to pile 24.

Magnetically attracted material from magnet 20 is discharged to belt 25 which feeds that material into an air cyclone separator 26 which drops the heavier ferrous materials onto belt 34 while conducting the lighter materials into the centrifugal separation portion of separator 26. Heavier materials are discharged through valve 29 to belt conveyor 31 and conducts the lighter materials through blower 27 and into dust filter 28 where solids are discharged onto belt conveyor 31. The ferrous materials on belt conveyor 33 are weighed and discharged onto collection pile 36 for eventual use elsewhere.

The lighter materials from belt conveyor 31 are recycled back to vibrating conveyor belt 19 to pass through the field of magnet 20 to attract any ferrous values that might have gotten past magnet 20 on its first pass without being picked up. Collection piles 24 and 36 may be subjected to further handling as desired. Perhaps the trash in pile 24 may be subjected to other separation procedures, e.g., to recover glass or plastic materials. The ferrous collection in pile 36 may be transported to a steel mill to supplement the feed to a furnace. Still other options may be available for these products and by-products of this process.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A process for recovering ferrous values from waste material which comprises the steps of:
    (1) feeding a stream of particulate municipal waste material to a size reduction procedure to produce a particulate mass wherein the particles have a predetermined maximum size;
    (2) passing the size-reduced particles from step (1) through the field of a first magnet to separate a first mass of ferrous materials from a remaining portion of the first mass passing through the field;
    (3) passing the first mass of ferrous materials through the field of a second magnet to separate a second mass of ferrous materials from a remaining portion;
    (4) combining the remaining portions passing through the first and second magnets for subsequent treatment;
    (5) separating ferrous materials from the second mass after step (3) to produce a ferrous product portion and a ferrous by-product portion; and
    (6) recycling the ferrous by-product portion to the first mass of ferrous materials in step (3).

2. The process of claim 1 wherein the first and second magnets each comprise magnetic materials.

3. The process of claim 2 wherein step (3) includes a vibrating belt conveyor.

4. The process of claim 1 wherein step (5) includes the step of:
    (7) passing the ferrous materials from the second mass after step (3) through moving air to produce a ferrous product portion and a ferrous by-product portion.

5. The process of claim 4 wherein the moving air step includes the following steps:
    (8) separating heavy ferrous product portion from light ferrous and non-ferrous mixture; and
    (9) cleaning the mixture to produce the ferrous by-product portion.

6. The process of claim 5 wherein step (9) includes a cyclone separation step to separate heavier particles from lighter particles and collecting fine particles from the lighter particles by a filtration step.

7. The process of claim 4 wherein the moving air of step (5) produces a dust by-product which is subjected to filtration to collect dust particles.

8. The process of claim 4 wherein step (7) is accomplished by passing the ferrous materials from step 3 through a gaseous cyclone separator.

9. The process of claim 1 wherein the size reduction procedure includes passing the particulate municipal waste materials through a shredding operation.

10. A continuous process for recovering ferrous materials from a mass of dry municipal waste which comprises the sequential steps of:
    (1) continuously feeding dry particulate municipal waste material to a shredding operation to produce a mass of particles having a predetermined maximum size;
    (2) continuously passing a stream of shredded particulate waste material from step (1) through the field of a first magnet to separate a first mass of magnetically attracted particles from a first remainder of the shredded particulate waste material from step (1);
    (3) continuously passing the separated first mass of magnetically attracted particles through the field of a second magnet to separate a second mass of magnetically attracted particles from a second remainder of the shredded particulate waste material from the shredded particulate waste material from steps (1) and (2);
    (4) combining the first and second remainders for subsequent treatment;
    (5) passing the second mass of magnetically attracted particles through an air classification step, to produce a ferrous particulate product, and collecting the by-product waste material produced in the air classification step for further processing; and
    (6) recycling the by-product waste material to step (3) and adding in to the first mass of ferrous materials to be passed through the field of the second magnet.

11. The process of claim 10 which includes a step of removing from the feed stream into the shredding operation all materials that resist the shredding operation and are greater in size than the predetermined maximum size.

12. The process of claim 10 wherein the first mass of magnetically attracted particles in step (3) is subjected to a vibrating conveyor as it is passed through the field of the second magnet.

13. The process of claim 10 wherein step (5) includes feeding the product of step (3) into the intake of a gaseous cyclone separator to separate heavy ferrous particles from lighter waste material.

14. The process of claim 10 which includes recovering dust particles from the air classification process.

15. The process of claim 10 wherein the first and second magnets comprise magnetic materials attached to a continuously moving endless belt.

16. The process of claim 10 wherein step (5) includes a metal cleaning step for separation of ferrous metal from waste material clinging to the ferrous metal.

17. The process of claim 10 wherein the passage of magnetically attracted particles through an air classification step includes feeding the magnetically attracted particles into a vertically upwardly moving column of air heading into an air cyclone separator, and adjusting the force of the column so as to allow particles of ferrous material to fall downwardly by gravity through the column while lighter weight waste material is carried upwardly by the column.

18. The process of claim 17 wherein the outflow from the cyclone separator is fed into a baffled filtration zone wherein solid particles are collected.

19. The process of claim 10 wherein solid materials are reduced in size to a maximum of three inches in step (1) and materials larger than three inches are removed from the stream of shredded particulate waste material entering into step (2).

20. A process for recovering ferrous values from waste material which comprises the steps of:
   (1) feeding a stream of particulate municipal waste material to a size reduction procedure to produce a particulate mass wherein the particles have a maximum size of three inches;
   (2) magnetically separating ferrous material from a remaining material in the stream;
   (3) passing the separated ferrous materials separated in step 2 through an air classification step to produce a ferrous product portion and a ferrous by-product portion; and
   (4) recycling the ferrous by-product portion to the remaining material of step (2) above.

* * * * *

UNITED STATES PATENT AND TRADEMARK OFFICE
CERTIFICATE OF CORRECTION

PATENT NO. : 5,890,663
DATED : Apr. 6, 1999
INVENTOR(S) : Larry Strach; Gary M. Carraux; Ronald H. Ogletree It is certified that error appears in the above-identified patent and that said Letters Patent is hereby corrected as shown below:

```
On title page, item [54]
        in the title, cancel "PERROUS" and insert --FERROUS--

Column 1, line 1, cancel "PERROUS" and insert

--FERROUS--
```

Signed and Sealed this

Fifth Day of October, 1999

Attest:

Q. TODD DICKINSON

Attesting Officer

Acting Commissioner of Patents and Trademarks